United States Patent [19]

Ortiz, Jr.

[11] Patent Number: 5,418,882
[45] Date of Patent: May 23, 1995

[54] OPTICAL FIBER FOR HIGH POWER LASER TRANSMISSION

[75] Inventor: Angel L. Ortiz, Jr., Scotia, N.Y.

[73] Assignee: General Electric Company, Schenectady, N.Y.

[21] Appl. No.: 202,310

[22] Filed: Feb. 25, 1994

Related U.S. Application Data

[63] Continuation-in-part of Ser. No. 950,545, Sep. 25, 1992, abandoned.

[51] Int. Cl.[6] ................................................. G02B 6/22
[52] U.S. Cl. ..................................... 385/124; 385/126; 385/127; 385/128; 385/144
[58] Field of Search ............... 385/124, 126, 127, 128, 385/123, 142, 144, 145

[56] References Cited

U.S. PATENT DOCUMENTS

| | | | |
|---|---|---|---|
| 4,185,890 | 1/1980 | Onoda et al. | 385/124 X |
| 4,230,396 | 10/1980 | Olshansky et al. | 385/127 X |
| 4,465,334 | 8/1984 | Simsen et al. | 385/124 X |
| 4,664,474 | 5/1987 | Tanaka et al. | 385/127 |
| 4,727,237 | 2/1988 | Schantz | 219/121 LC |
| 4,755,022 | 7/1988 | Ohashi et al. | 385/124 X |
| 4,770,492 | 9/1988 | Levin et al. | 385/127 X |
| 4,799,754 | 1/1989 | Goldenberg | 385/33 |
| 4,830,460 | 5/1989 | Goldenberg | 385/117 |
| 4,946,239 | 8/1990 | Garmon | 385/124 |
| 4,962,996 | 10/1990 | Cuellar et al. | 385/141 |

OTHER PUBLICATIONS

"On-The-Fly Drilling with a Fiber Delivered Face Pumped Laser Beam," by AL Ortiz, Jr., Journal of Laser Applications, vol. 4, No. 2, 1992.

*Primary Examiner*—Frank Gonzalez
*Assistant Examiner*—Hemang Sanghavi
*Attorney, Agent, or Firm*—Douglas E. Erickson; Paul R. Webb, II

[57] ABSTRACT

An optical fiber has a fiber core which includes a step index core portion and a graded index core portion located substantially around the step index core portion. The optical fiber also has a cladding located substantially around the graded index core portion and an outer jacket located substantially around the cladding. The optical fiber design allows high power laser transmission which minimizes modal-dispersion problems and delivers improved high power fiber-delivered beam quality.

8 Claims, 6 Drawing Sheets fig. 3a fig. 1a
PRIOR ART fig. 1b
PRIOR ART fig. 2a
PRIOR ART fig. 2b
PRIOR ART fig. 3a fig. 3b fig. 4a fig. 4b fig. 5 fig. 6 fig. 7 fig. 8

OPTICAL FIBER FOR HIGH POWER LASER TRANSMISSION

This application is a CIP of 07/950,545 filed Sep. 25, 1992, now abandoned.

BACKGROUND OF THE INVENTION

1. Field of the Invention

This invention relates generally to optical fibers, and more particularly to optical fibers for high power laser transmission, such as that for laser drilling and cutting.

2. Description of the Related Art

Many fiber geometries are well known in the art. Exemplary of such prior art optical fiber geometries are step index, graded index, single and multi-mode, birefringence and polarization preserving fibers, and fibers whose cores are doped for generating fiber/laser amplifiers for long distance data transmission. These are fibers made from various glasses, quartz, fused silica, metals, and plastics which are manufactured as straight or tapered fibers. Likewise, fiber geometries such as fiber bundles are used for various imaging systems, are not suitable for high power laser transmission. This is because these fiber bundles burn when impinged with a high power laser beam.

With respect to step index and graded index fibers, step index multi-mode fiber used in high power laser beam transmission suffers from what is known in the art as modal dispersion. This means that each individual mode does not travel at the same longitudinal speed since their length varies with their respective total internal reflection angles within the fiber. To avoid this limitation, designers developed graded index fibers during the early 1980's. This design allows the speed of light to be a function of the radius of the fiber core thus making each individual mode travel at the same longitudinal distance even through their path lengths are different. Light travels faster in lower index of refraction media. Therefore, the further the beam is from the fiber's center axis, the greater its speed. Instead of the laser beam being reflected as in step index fiber, the beam is now bent or continuously refracted in an almost sinusoidal pattern, thus the term "self focusing fiber". The major disadvantage of using graded index fiber for high power laser transmission is that because of the self focusing effect within the fiber, the laser beam is focused within the fiber core generating high energy densities. These high energy densities can cause a fiber core breakdown thus the fiber may self-destruct at average laser powers exceeding approximately 50 watts. Therefore, an advantageous optical fiber, then, would be presented if such amounts of modal dispersion were reduced.

It is apparent from the above that there exists a need in the art for a fiber optic which is capable of handling high power laser transmissions, and which at least equals the safety characteristics of known fiber optics, but which at the same time is capable of substantially reducing modal dispersion of the laser transmission. It is a purpose of this invention to fill this and other needs in the art in a manner more apparent to the skilled artisan once given the following disclosure.

SUMMARY OF THE INVENTION

Generally speaking, this invention fulfills these needs by providing an optical fiber having a fiber core which includes a step index core portion and a graded index core portion located substantially around the step index core portion. The optical fiber also has a cladding located substantially around the graded index core portion and an outer jacket located substantially around the cladding.

In certain preferred embodiments, the step index core portion is comprised of anhydrous, fused silica. Also, the graded index core portion is comprised of anhydrous, fused silica doped with fluorine, boron or germanium. Also, the cladding is comprised of glass or a polymeric material to allow for total internal reflection. Also, the outer jacket is comprised of clear nylon. Finally, a silicone buffer layer may be added between the cladding and the outer jacket if a glass cladding is used.

In another preferred embodiment, the modal dispersion of the partially graded optical fiber is substantially reduced which greatly improves the fiber delivered beam quality.

The preferred optical fiber, according to this invention, offers the following advantages: reduced modal dispersion; excellent high power laser transmission characteristics; good stability; good durability; good economy; and improved fiber delivered laser material processing capability due to the improved fiber delivered beam quality. In fact, in many of the preferred embodiments, these factors of reduced modal dispersion and high power laser transmission are optimized to an extent that is considerably higher than heretofore achieved in prior, known optical fibers.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several views and in which.

DETAILED DESCRIPTION OF THE INVENTION

Figure 1A:
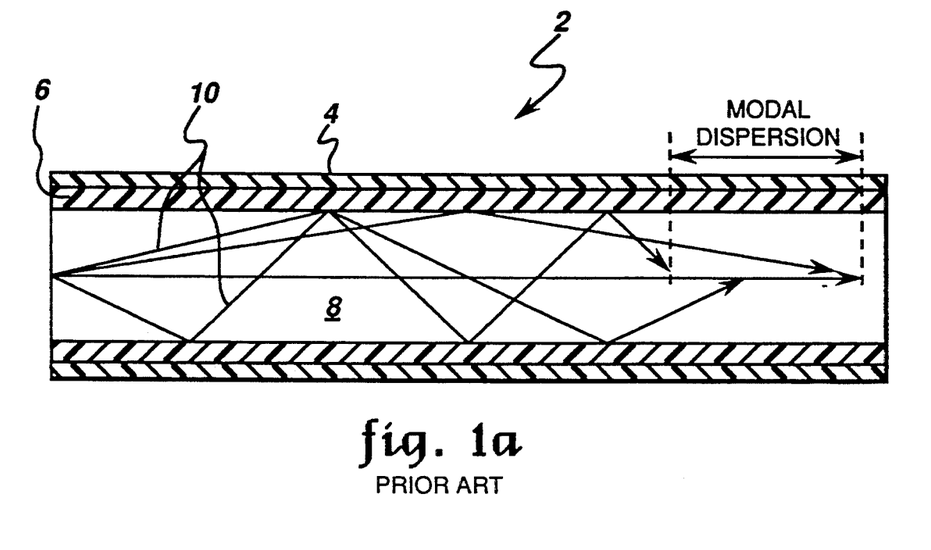
FIGS. 1a and 1b are a schematical illustration of a conventional step index optical fiber and a refractive index profile, respectively, according to the prior art.
Figure 1B:
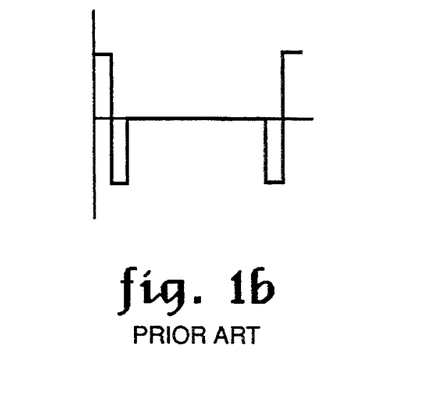

With reference first to FIG. 1a, there is illustrated a conventional step index optical fiber 2. Fiber 2 includes, in part, outer jacket 4, cladding 6, and fiber core 8. In particular, outer jacket 4, is typically constructed of nylon. Cladding 6, typically, is constructed of any suitable polymer. Fiber core 8, typically, is constructed of any suitable fused silica. FIG. 1b shows a relative trace of the behavior of the index reaction for a typical step index optical fiber 2.

Figure 2A:
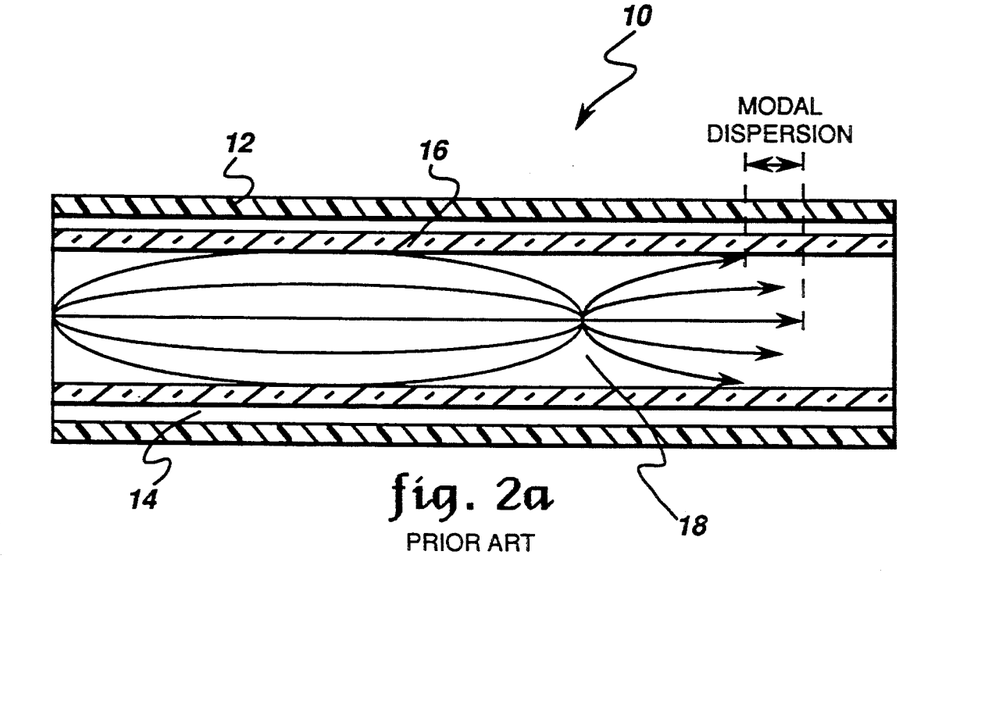
FIGS. 2a and 2b are a conventional multi-mode graded index optical fiber and a refractive index profile, respectively, according to the prior art.
Figure 2B:
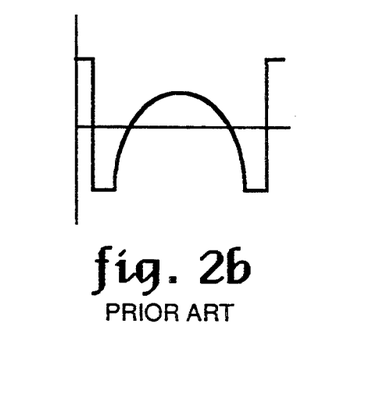

FIG. 2a illustrates a conventional multi-mode graded index optical fiber 10. Fiber 10 includes, in part, outer jacket 12, buffer layer 14, cladding 16, and graded fiber core 18. Outer jacket 12, typically, is constructed of nylon. Cladding 16, typically, is constructed of glass. FIG. 2b illustrates the relative trace of behavior of the index refraction for fiber 10. Finally, as can be seen in FIGS. 1a and 2a, the modal dispersion is greatly reduced when one goes from a conventional step index optical fiber to a conventional multi-mode graded index optical fiber. Thus, one can infer from the above discussion that the use of a multi-mode graded index fiber greatly increases the beam quality. However, as discussed earlier, the use of the multi-mode graded index fiber is limited to average laser powers not exceeding approximately 50 watts.

Figure 3A:
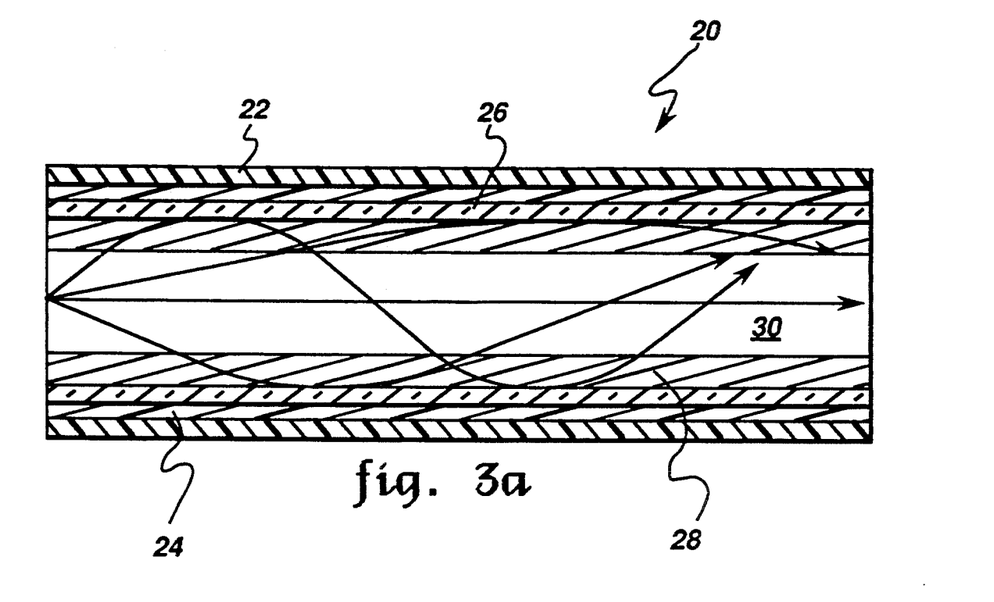
FIGS. 3a and 3b are an optical fiber and a refractive index profile, respectively, according to the present invention.
Figure 3B:
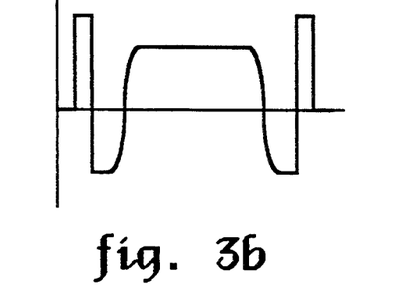

FIG. 3a illustrates an optical fiber 20 according to the present invention. Fiber 20 includes in part, outer jacket 22, buffer layer 24, cladding 26, and a fiber core which includes a graded index core portion 28 and a step index core portion 30. In particular, outer jacket 22, preferably, is constructed of a clear nylon. Buffer layer 24, preferably, is constructed of silicone. Cladding 26, preferably, is constructed of glass. Graded index core portion 28, preferably, is constructed of anhydrous fused silica doped with fluorine, germanium or boron or any combination thereof and has a diameter of approximately 400 to 600 microns. Step index core portion 30, preferably, is constructed of anhydrous, fused silica and has a diameter of approximately 400 microns. It is to be understood that graded index core portion 28 and step index core portion 30 can measure from 100 to 2000 microns in diameter with the ratio of graded index core portion 28 to stop index core portion 30 also varying according to the fiber design required by the operator which will provide the fiber delivered beam quality and high power laser transmission quality. Glass cladding 26 surrounds graded index core portion 28 and step index core portion 30 to allow for total internal reflection. Optical fiber 20 improves the fiber delivered beam quality through suppression of the generation of higher modes in the fiber. This accomplished by speeding up the laser beam time of travel within the graded core portion 28 so that the laser beam portion with high reflection angles travels faster and remains closer to the central locus of the laser beam as compared to a conventional step index fiber (FIG. 1a). This is clearly illustrated by the index of refraction curve in FIG. 3b.

Figure 4A:
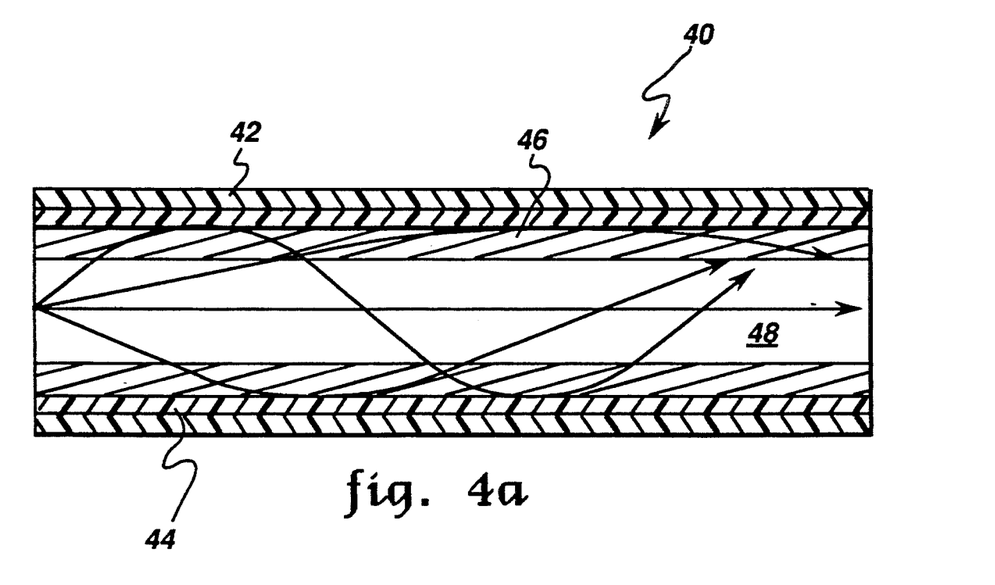
FIGS. 4a and 4b are a schematical illustration of another embodiment of an optical fiber with polymer cladding and a refractive index profile, respectively, according to the present invention.
Figure 4B:
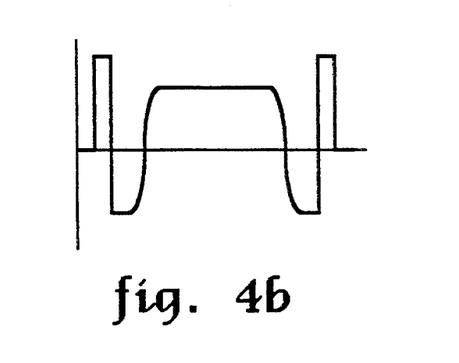

FIG. 4a illustrates another embodiment of an optical fiber 40. Fiber 40 includes, in part, outer jacket 42, cladding 44 and a fiber core which includes a graded index core portion 46 and a step index core portion 48. Outer jacket 42, preferably, is constructed of clear nylon. Cladding 44, preferably, is constructed of any suitable polymeric material. Graded index core portion 46, preferably, is constructed of anhydrous, fused silica doped with fluorine, boron, or germanium or any combination thereof and has a diameter of approximately 400 to 600 microns. Step index core portion 48, preferably, is constructed of anhydrous, fused silica and has a diameter of approximately 400 microns. It is to be understood that graded index core portion 46 and step index core portion 48 can measure from 100–2000 microns in diameter with the ratio of graded index core portion 46 to step index core portion 48 also varying according to the fiber design required by the operator which will provide the fiber delivered beam quality and high power laser transmission quality. Optical fiber 40 is different from optical fiber 30 only in that the cladding 44 of optical fiber 40 is polymer based, thereby eliminating the need for a buffer (see buffer 24 in FIG. 3a). As was the case with optical fiber 30, optical fiber 40 improves the fiber delivered beam quality through suppression of the generation of high order modes in the fiber. This is clearly illustrated by the index of refraction curve in FIG. 4b.

Figure 5:
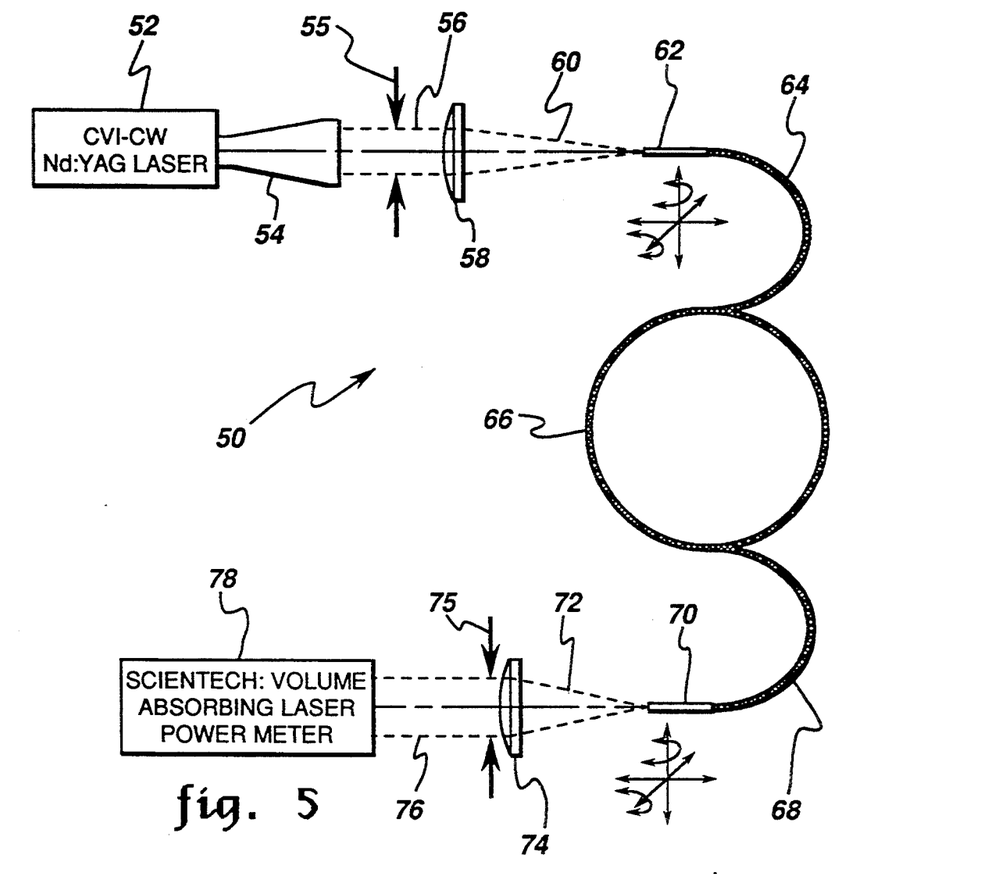
FIG. 5 is a schematical illustration of a conventional fiber delivery characterization system, according to the present invention.
Figure 7:
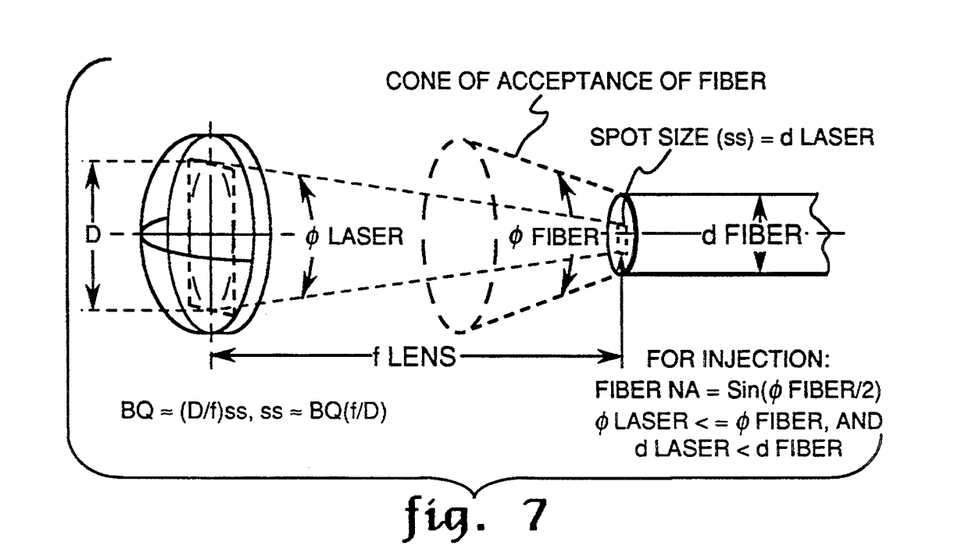
FIG. 7 is a diagrammatical illustration of a laser injection into an optical fiber with a plano-convex lens, according to the present invention.

FIG. 5 is a schematical illustration of a fiber delivery characterization system 50. System 50 includes, in part, laser 52, collimator 54, conventional alignment iris diaphragm 55, laser beam 56, lens 58, laser beam 60, fiber holder and manipulator 62, fiber 64, fiber spool 66, fiber 68, fiber holder and manipulator 70, laser beam 72, lens 74, conventional motorized iris diaphragm 75, laser beam 76 and power meter 78. In particular, laser 52 is any suitable high power solid state laser. Collimator 54 is a 10X Up collimator. Lens 58 is an A.R. coated, plano-convex, fused silica injection lens. Holder 62 is a conventional 5-axis manipulator. Holder 70 is the same as holder 62. Lens 74 is a A.R. coated, plano-convex fused silica, fiber output, collimating lens. Power meter 78 is a volume absorbing laser power meter constructed by Scientech. With respect to FIG. 5, a 2 watt, continuous wave Nd:YAG laser 52 is characterized and used as the injection source. The fiber ends located at holders 62 and 70 are polished and positioned using standard means as known in art. The fiber injection is optimized by using a conventional alignment iris diaphragm 55 for autocollimating the fiber face reflection back to laser source 52 and by obeying the fundamentals of laser injection in an optical fiber as shown in FIG. 7. Fiber face reflection autocollimation eliminates fiber delivered BQ degradation caused by angular laser beam injection in the fiber. The fiber output is characterized by using a motorized iris diaphragm 75, collimating lens 74, and a power meter 78 as shown in FIG. 5.

Figure 6:
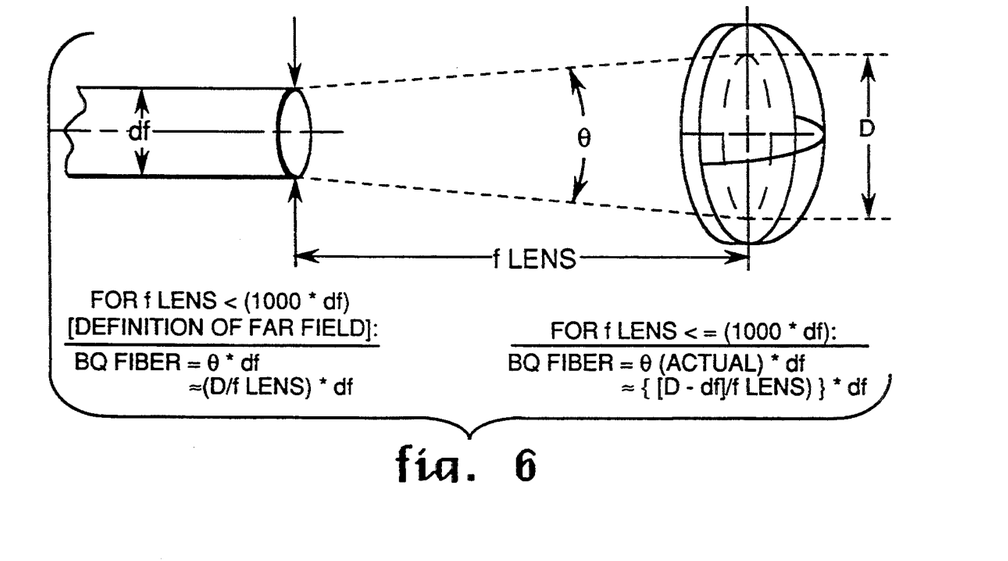
FIG. 6 is a diagrammatical illustration of a fiber delivery characterization.

With reference to FIG. 6, there is illustrated a diagrammatic drawing of a fiber delivered beam quality. A characterization of the fiber output beam quality is achieved by measuring the fiber output beam divergence (full angle). The fiber delivered beam quality is determined by first calculating the fiber output for angle beam divergence (0). This is calculated by:

$$\theta = \tan^{-1}(D/f) \quad (1)$$

where $\tan^{-1}(D/f)$ is in mrads, D is the measured $1/e^2$ collimated beam diameter on the collimating lens in millimeters and f is the collimating lens focal length used for characterization in millimeters. Equation (1) can be approximated by $\theta \simeq (D/f)$ for small angles. The fiber delivered BQ is now determined by:

$$BQ_{rib} = \theta * df \quad (2)$$

where df is the fiber diameter in mm. It is obvious that as a fiber output divergence decreases, the fiber delivered beam quality improves. The lower the beam quality number (Millimeter-milliradians) the better the beam quality. The fiber delivered beam quality also can be improved by using smaller diameter fibers.

FIG. 7 illustrates the fundamentals of laser injection into an optical fiber. A power laser beam with a beam quality (BQ) has a beam diameter (D) on the plano-convex lens.

The simple formulae:

$$BQ = \tan^{-1}(D/f) * ss \quad (3)$$

and $$FiberNA = \sin(\phi_{Fiber}/2) \quad (4)$$

where BQ equals the laser source beam quality in mm-mrad, $\tan^{-1}(D/f)$ is in radians, D equals $1/e^2$ laser beam diameter on the focusing lens in mm, f equals injection lens focal length in mm, ss=laser beam focus spot size (diameter) on the fiber tip in microns, Fiber NA defines the fiber numerical aperture, and $\phi_{Fiber}$ describes the acceptance cone angle of the fiber, provide the fundamental theory for high power laser injection into fibers. Equation (3) can be approximated by $BQ \approx \tan^{-1}(D/f) * ss$ because $\tan^{-1}(D/f) \approx D/f$ for small angles. Solving for ss provides:

$$ss = BQ/\tan^{-1}(D/f) \quad (5)$$

Close approximation of equation (5) will reveal the standard equation used in laser focused spot size calculations as indicated by:

$$W_o = f * \theta \quad (6)$$

where $W_o$ equals a focused laser spot radius, f equals the focusing lens focal length, and $\theta$ equals the laser half angle beam divergence. For equation (5), BQ is in mm-mrad, $\tan^{-1}(D/f)$ is in radians thereby cancelling out the radians in the BQ term leaving the spot size dimension as $mm \times 10^{-3}$ or microns. For successful fiber injection:

$$\phi_{Laser} \leq \phi_{Fiber} \quad (7)$$

and $$d_{laser} < d_{Fiber} \quad (8)$$

where $\phi_{Laser}$ defines the injection cone angle of the laser beam injecting the fiber, $\phi_{Fiber}$ describes the acceptance cone angle of the fiber, $d_{laser}$ describes the diameter of the focused laser beam on the fiber input face, and $d_{Fiber}$ is the fiber core diameter in FIG. 7. The fiber numerical aperture (NA) is typically determined by the fiber core and cladding material used in the fiber optic manufacturing process.

Figure 8:
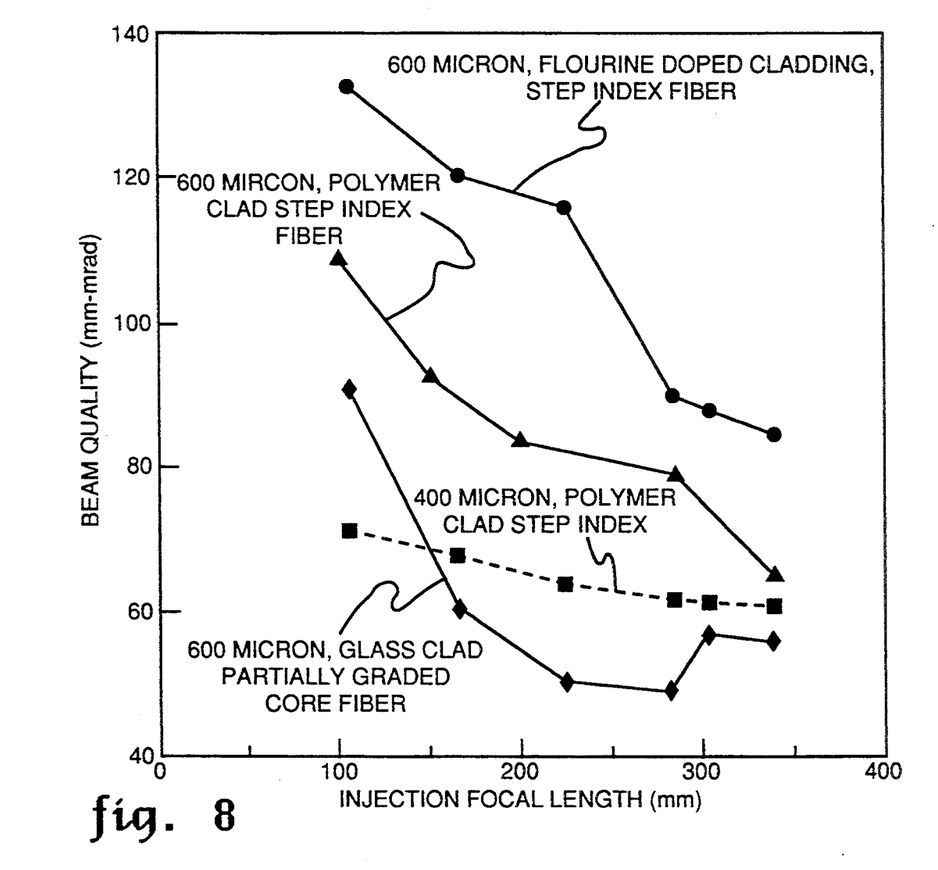
FIG. 8 is a graphical illustration of fiber delivered beam quality in mm-mrad versus injection focal length in mm.

FIG. 8 shows fiber delivered BQ as a function of injection focal length for various commercially available optical fibers. Curve #1 of FIG. 8 shows the BQ delivered for an anhydrous, fused silicon 600 micron diameter core, fluoride doped glass cladded step index fiber. BQ ranges from 132 to 84 mm/mrad for 100 to 339.5 mm injection, respectively. Curve #2 shows the results of an anhydrous, fused silica 600 micron diameter core, polymer (silicone) cladded step index fiber. This is the typical fiber of choice for efficient high power laser transmission which enables excellent laser material processing capabilities. BQ ranges from 109 to 65 mm/mrad for 100 to 339.5 mm injection, respectively. Curve #3 shows results of an anhydrous, fused silica 400 micron diameter core, polymer (silicone) cladded step index fiber. If we refer to the fiber delivered BQ characterization fundamentals shown in FIG. 6, decreasing the fiber diameter improves fiber delivered BQ. Curve #3 verifies these characterization fundamentals. Likewise, the 400 micron diameter fiber delivered better BQ than its 600 micron diameter counterpart providing a BQ range of 71 to 60 mm-mrad for 100 to 339.5 mm injection, respectively. Curve #4 shows the fiber delivered BQ from a fiber utilizing the instant invention configuration. Dramatic BQ improvements over all the above mentioned fiber configurations is obvious. If we compare the BQ delivered by the fiber represented by Curve #2 and the instant invention fiber represented by Curve #4, we find BQ improvements of 17%, 26%, 34%, 35%, 37%, 24% and 14% for injection values of 100, 150, 200, 250, 285, 305 and 339.5 mm, respectively. The peak power density (PPD) is defined as:

$$PPD = E_{lp}/\Delta t_p/A \quad (9)$$

where $E_{lp}$ is the laser pulse energy in joules, $\Delta t_p$ is the full-width-half-max laser pulse length in sec., and A=the focused spot size area in $cm^2$. Likewise, the area of this spot size is taught by the formula:

$$area = \pi d^2/4 \quad (10)$$

and after substitution $$area = \pi * [BQ * f/D]^2/4 \quad (11)$$

illustrates how the PPD is affected by BQ. To further dramatize significance of the instant invention, if we compare the fiber delivered BQ from FIG. 8, Curves #2 and #4 at 150 mm injection, we obtain BQ values of 93 and 69 mm-mrad respectively. If we ratio the square of the BQ values, we obtain $$93^2/69^2 = 1.817 \quad (12)$$

indicating an 81.7% improvement in PPD and, therefore, a significant increase in material processing capability.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. An optical fiber, wherein said fiber is comprised of:
   a) a fiber core having a diameter between generally 100 and 2,000 microns and including:
      (1) a step index core portion; and
      (2) a graded index core portion located substantially around said step index core portion, wherein said step and graded index core portions have a common boundary and wherein the index of refraction of said step index core portion is equal generally to the index of refraction of said graded index core portion at said common boundary;
   b) a cladding located substantially around said graded index core portion; and
   c) an outer jacket located substantially around said cladding.

2. The optical fiber, as in claim 1, wherein said step index core portion is further comprised of:

anhydrous, fused silica.

3. The optical fiber, as in claim 1, wherein said graded index core portion is further comprised of:
   anhydrous, fused silica doped with fluorine, germanium or boron.

4. The optical fiber, as in claim 1, wherein said cladding is further comprised of:
   a glass cladding.

5. The optical fiber, as in claim 1, wherein said outer jacket is further comprised of:
   a clear nylon jacket.

6. The optical fiber, as in claim 1, wherein said optical fiber is further comprised of:
   a buffer layer located substantially between said outer jacket and said cladding.

7. The optical fiber, as in claim 1, wherein said buffer layer is further comprised off
   a silicone buffer layer.

8. The optical fiber, as in claim 1, wherein said cladding is further comprised of:
   a polymeric cladding.

* * * * *